Dec. 11, 1962 B. J. WARMAN 3,068,324

AUTOMATIC TELECOMMUNICATION AND LIKE SWITCHING SYSTEMS

Filed Feb. 18, 1960

2 Sheets-Sheet 1

INVENTOR

BLOOMFIELD JAMES WARMAN

BY Lawson and Taylor

INVENTOR
BLOOMFIELD JAMES WARMAN
BY Lawson and Taylor

United States Patent Office 3,068,324
Patented Dec. 11, 1962

3,068,324

AUTOMATIC TELECOMMUNICATION AND LIKE SWITCHING SYSTEMS

Bloomfield James Warman, London, England, assignor to Associated Electrical Industries Limited, London, England, a British company Filed Feb. 18, 1960, Ser. No. 9,474
Claims priority, application Great Britain Feb. 26, 1959
4 Claims. (Cl. 179—18)

Figure 1:
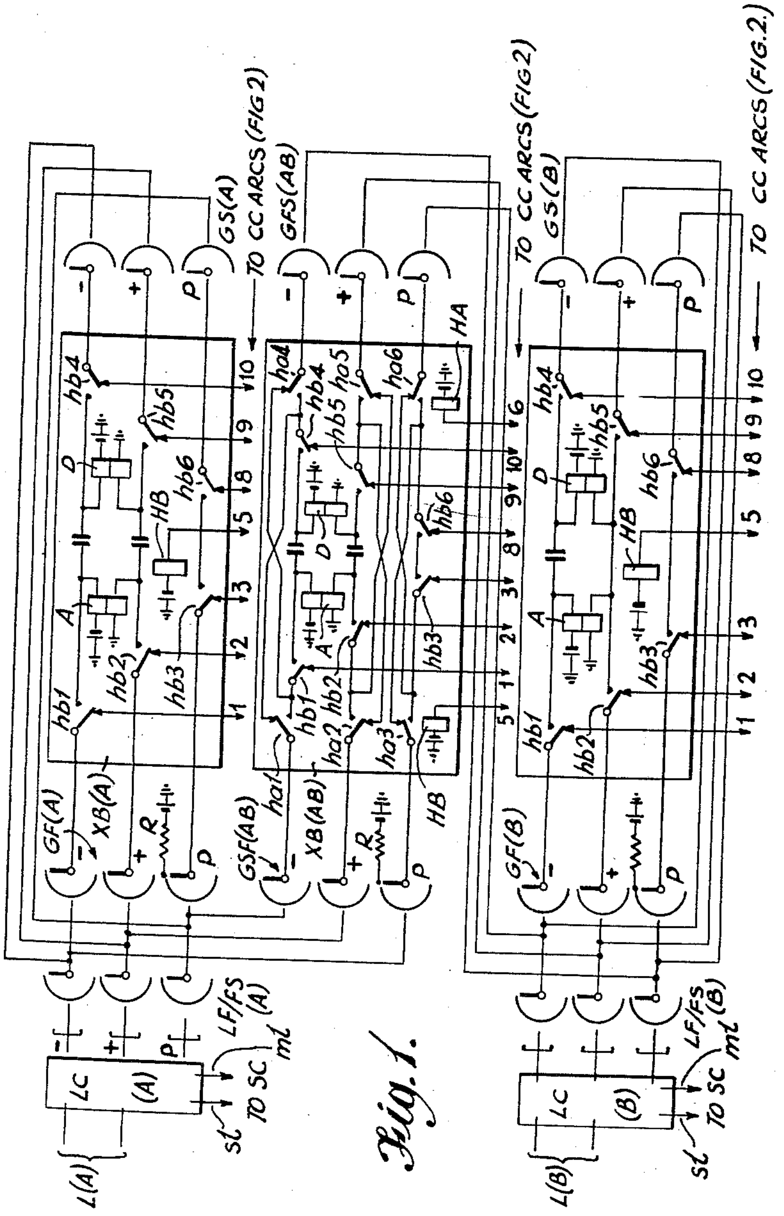

This invention relates to automatic telecommunication switching systems and the like.

In a known form of automatic telephone switching system, subscribers' and possibly other lines are connected in multiple to line finder switches of a line finder switching stage, and consequent upon a calling condition on a line, one of these switches is set to the calling line. Digit impulses, received over the calling line as information regarding the identity of a line being called, are passed by way of the set switch to a register which, on the basis of this information, controls the setting of other switches including, in the case of a call to a local subscriber, the setting of a final selector switch to the called line.

As is well known such switching systems normally include so-called transmission bridge circuits which, in addition to the normal function of feeding direct current to the lines, also serve the functions of affording access between a register and both the calling line and the called line during the setting up of a call, of subsequently coupling the calling and called lines to each other so that the register can be released for use on other calls, of maintaining the coupling between these lines, as by applying or extending a P-wire holding condition, until the bridge circuit is released at the end of the call, and of isolating the calling and called lines from each other in respect of control signals as distinct from each signals transmitted over the communication (speech) paths.

It has been proposed to combine line finding and final selection in a single stage of what will be called primary switches capable of fulfilling both functions. To this end a calling condition on a line may cause the transmission of the calling line's identity to a register over a by-path circuit independent of the primary switches, the register then acting on the basis of the information it has received to set a primary switch to the calling line. The register thereafter receives impulse information regarding a called line's identity over the set primary switch and proceeds to set up the call over another of the primary switches, assuming the call to be local. Since the register-controlled functions of line finding and final selection both involve the setting of a switch in dependence on information contained in the register, both functions can be carried out in the same manner, for instance by revertive impulse control. The two functions can therefore be fulfilled in the same switching stage as stated. For a relatively large number of lines, the lines may be effectively divided into a number of groups, for instance of 1,000 lines each, each served by its own group of primary switches.

With a primary switching stage used for both line finding and final selection, transmission bridge circuits would have to be capable of providing access between any one primary switch serving a line finding function for any particular call and any other primary switch serving a final selection function for that call. Thus with the lines arranged in groups each served by its own group of primary switches, there would have to be provided, in addition to transmission bridge circuits giving access between switches in the same group, further linking transmission bridge circuits giving access between the switches in each group and switches in all other groups. Moreover the linking bridge circuits would have to afford access in both directions of transmission between any two groups and hitherto this has involved the provision of linking transmission bridge circuits some of which afford access in one direction while the others afford access in the reverse direction.

According to the present invention in a switching system for a number of groups of lines each served by a group of primary switches arranged for both line finding and final selection under control of a register, each group is associated with transmission bridge circuits affording access between primary switches within the group, and linking transmission bridge circuits are also provided which afford access between the primary switches of any two groups and which are reversible under control of a register whereby to afford access through them in either direction between primary switches: that is, in establishing a call between two lines in different groups, a register would select an appropriate one of the linking transmission bridge circuits and would selectively connect it, in dependence on the information possessed by the register as to the identities of the calling and called lines, so that the calling line is coupled to the incoming side of the bridge circuit and the called line to the outgoing side.

By thus employing reversible transmission bridge circuits the total number of bridge circuits can be reduced as compared with that required when employing non-reversible linking transmission bridge circuits, the additional equipment required for controlling the direction of operation being relatively small. For instance the selective connection of a linking transmission bridge circuit to permit transmission in one direction or the other between primary switches may be effected by a register simply by means of a reversing relay which the register operates or leaves unoperated in the transmission bridge circuit as may be required, this reversing relay having change-over contacts which effect the required connection of the incoming and outgoing sides of the transmission bridge to the calling and called lines respectively.

Figure 2:
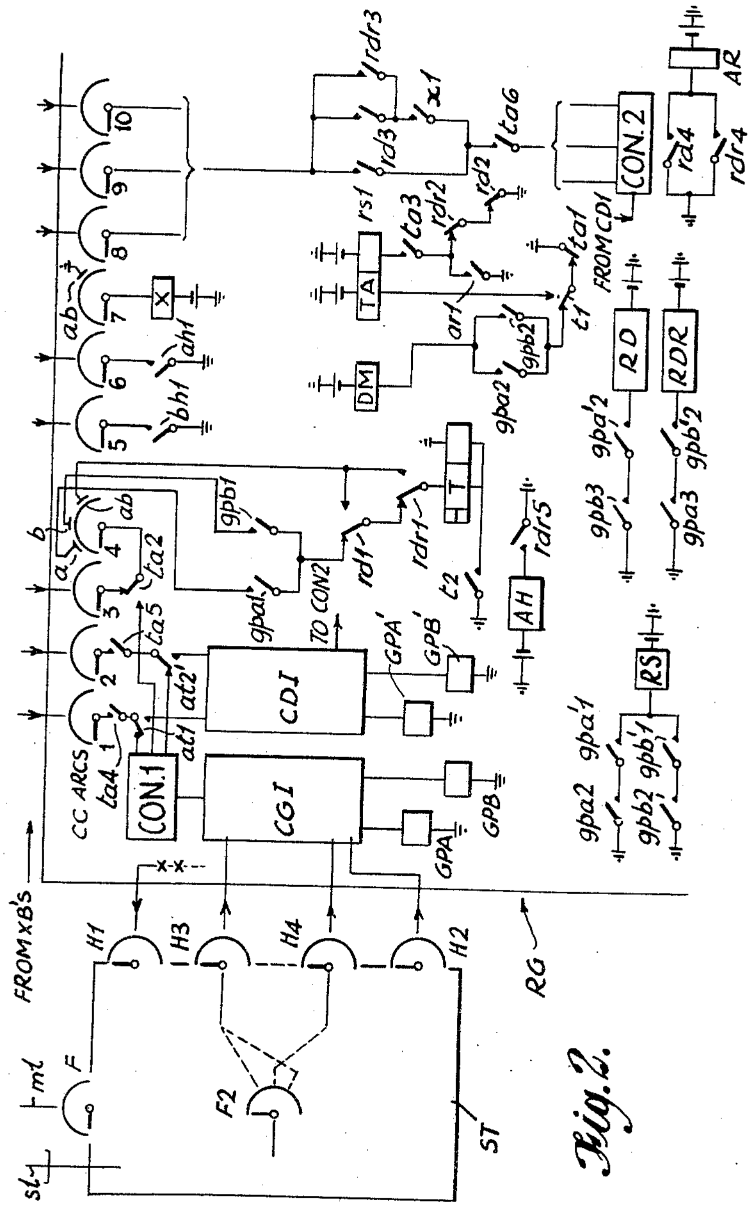

The invention, and the manner in which it may be put into practice, may be more readily understood from the following description of the accompanying drawings of which:

FIG. 1 shows, in the manner of a trunking diagram, the association of typical transmission bridge circuits with line finding and selecting switches and also shows certain details of the transmission bridge circuits, and FIG. 2 includes a schematic representation of a start circuit and also shows certain details of a register by which the action of the line finding and selecting switches can be controlled and the reversal of a linking transmission bridge brought about as required.

For the purpose of this description it is assumed that subscribers' or other lines L, which are connected to a primary switching stage LF/FS capable of serving both for line finding and final selection, are divided into a number of groups of which the lines in one group (A) are typified by line L(A) and the lines of another group (B) are typified by line L(B). There may be, say, 1,000 lines in each group, and each group may be further divided into sub-groups of, say, 50 lines each. Each line has its own + and − (speech) wires and an individual line circuit, such as LC(A) or LC(B), which is shown only in block form and may be constituted in any appropriate manner. Each line group such as A and B is served by its own group of primary switches, typified by LF/FS(A) and LF/FS(B), which can act either as line finders in respect of calling lines in the relevant group or as final selectors for called lines. Each primary switch LF/FS has +, − and P arcs over which the + and − line wires and the usual P-wires individually associated with the several lines of the group are multipled in the usual manner. Each group of primary switches has associated with it a group of transmission bridge circuits, typified by XB(A) for group A and XB(B) for group B, which are capable of affording access between any two primary switches in the relevant group. Each pair of primary switch groups, such as A and B taken together, has in addition a group of reversible linking transmission bridge circuits, typified by XB(AB), which are capable of affording access between any two switches in different groups of the relevant pair.

The typical transmission bridge circuits XB(A), XB(B) have been illustrated, as will be recognised by those skilled in the telephone art, as Stone transmission bridges comprising isolating capacitors C, contacts *hb1* to *hb6* of a switching-through relay HB, and relays A and D which, after the transmission bridge has been switched through, respond to the line loops of the calling and called lines respectively in order to provide holding and signalling functions. Further details of these transmission bridges have not been illustrated because their constitution and function are well known and can be found described, for instance, in volume 2 of the work "Telephony" by J. Atkinson at page 250 onwards. Moreover the invention is not restricted to this particular form of transmission bridge and may be applied with other forms, for instance of the transformer type.

The typical reversible linking transmission bridge circuit XB(AB), as illustrated, is the same as bridge circuits XB(A) and XB(B) with the addition of a reversing relay HA having change-over, reversing, contacts *ha1* to *ha6* the action of which will be described later.

Each transmission bridge circuit such as XB(A) and XB(B) serving a single line group is given access to all lines of the relevant group by the provision of secondary selector switches such as GF(A), GS(A) or GF(B), GS(B), which are individual to the bridge circuit concerned and of which those such as GF(A) and GF(B), which are connected between the primary switches LF/FS and the incoming sides I of the transmission bridges, constitute group finders in respect of calling line sub-groups, while those such as GS(A), GS(B), connected between the primary switches LF/FS and the outgoing sides O of the transmission bridges, constitute group selectors in respect of called line sub-groups. For the same reason each linking transmission bridge circuit has secondary switches such as GFS(AB) and GSF(AB) connected between its incoming and outgoing sides and the primary switches of the two groups which it links. Each of these secondary switches GFS(AB) and GSF(AB) acts either as a group finder or group selector according to the required direction of transmission between the linked groups. In the unoperated condition of the contacts *ha1* to *ha6* of relay HA (which is the condition shown in the drawing and is appropriate for a call from a line in group B to one in group A) the input side I of the bridge XB(AB) is connected to the primary switches LF/FS(B) of group B by way of secondary switch GFS(AB), which in this condition would therefore act as group finder in respect of a calling line sub-group in group B, and the output side O is connected to the primary switches LF/FS(A) of group A by way of secondary switch GSF(AB), which would therefore act as group selector in respect of a called line sub-group in group A. In the operated condition of relay HA (appropriate for a call from group A to group B) the contacts *ha1* to *ha6* reverse these connections, and switch GSF(AB) now acts as group finder while switch GFS(AB) acts as group selector.

Each line circuit such as LC(A) or LC(B) has two leads *sl* and *ml* which extend from it to a start circuit such as ST which is typical of several such start circuits each of which serves a particular sub-group of lines. The start leads *sl* from the line circuits associated with the several lines of a sub-group are commoned into the relevant start circuit such as ST, while the marking leads *ml* are taken to respective contacts of a test arc F1 of a selector switch F which constitutes a line hunter in the start circuit. Each start circuit such as ST also has a selector switch H which constitutes a register selector.

When a call is initiated by a line, the start lead *sl* and marking lead *ml* of its line circuit become marked to indicate the calling condition. In response to the marking on the start lead *sl* the line hunter F in the start circuit serving the calling line is initiated into operation to search for and set to the calling line, the operation being controlled over test arc F1 and being stopped on reaching the arc contact to which the marked marking lead *ml* is connected. The register selector H also searches for and sets to a free register, typified by RG, which has access back to the calling line. This register selecting action is controlled over a test arc H1 of the register selector, each register being allocated on the test arc H1 a particular contact which is marked in any convenient manner (not shown) according to the free or busy condition of the register. When the register selector H has become set to a free register, signalling by-paths are established over arcs such as H2, H3, H4 of the register selector in order to pass to the selected register the digital information which it requires regarding the calling line's identity in order to enable it subsequently to control the setting of a group finder and line finder to the calling line. Certain digits of the calling line's identity, for instance the thousands and hundreds digits, may denote the line group and sub-group of the line, and since each start circuit serves a particular sub-group, these digits may be passed to the register, over arcs typified by H2 of the register selector H as fixed markings unique to the start circuit concerned. Other digits of the calling line's identity, for example the tens and units digits, may be passed to the register, over register selector arcs such as H3 and H4, as markings extended to these arcs over arcs such as F2 of the line hunter F when the latter has become set to the calling line. The start circuit and the manner of passing a calling line's identity to a register seized for the call are of no direct concern to the present invention and it is not thought necessary to consider them in any more detail because it will be apparent to those skilled in the art how the required functions may be carried out. Forms of start circuit capable of serving these and other functions can also be found described in detail in our co-pending application Serial No. 862,190, filed December 28, 1959.

Since the functions of line finding and final selection are combined in the primary switches, the number of primary switches required can be reduced. If these switches are motor uniselectors, it then becomes a practical proposition from the economic aspect to employ motor uniselectors as line hunters and register selectors in the start circuits also, thus taking advantage of the relatively fast speed of operation of this kind of selector. Using motor uniselectors as the register selectors, it becomes practicable to make all the registers available to all the start circuits.

Considering now the typical register RG, it includes two digit stores CGI and CDI of which CGI stores digital information received from a start circuit regarding the identity of a calling line and CDI subsequently receives and stores digital information received over the calling line to identify a called line. These digit stores, which have been shown only in block form because they may take any well known form, may each be constituted for instance by a number of dekatron multi-cathode, cold cathode electronic storage tubes, one for each digit to be stored. The setting of the store CGI according to the identity of a calling line may be effected directly by the markings passed to the register by a start circuit, whereas the setting of the store CDI according to the identity of a called line may be effected by counting the number of impulses in successive impulse trains, e.g. dialled impulse trains, received from the calling line over a set line finder and group finder. Once the store CGI has been set, it operates a group relay such as GPA or GPB in dependence on the group to which the identified calling line belongs, there being one such relay for each line group. For instance if store CGI includes a dekatron tube in which the thousands digit of a calling line is registered by the investment of a particular one of the (ten) cathodes of the tube by its arc discharge, then each group relay could be connected to respond to the investment by the discharge of the cathode relating to the group concerned. In like manner the store CDI, once it has been set to register a called line's identity, operates a group relay such as GPA' or GPB' according to the group in which the called line is included.

Each register typified by RG also includes a coupling switch CC which gives it access to the transmission bridge circuits over contact arcs CC1 to CC10. It is assumed that this coupling switch is constituted by a motor uniselector, its controlling latch magnet being represented by DM. Since each transmission bridge circuit has access to all (1,000) lines connected to the group of primary switches LF/FS which it serves, the number of bridge circuits required, and thus the number of secondary switches such as GF, GS, GFS, GSF, can be reduced because of the resultant greater availability of the transmission bridge circuits to the lines. Moreover the availability may then be so great that it would be unnecessary to give each register access to all the transmission bridge circuits. Each register may therefore be given access through its coupling switch CC to only a sub-group of each main group (linking or otherwise) of the transmission bridge circuits, these sub-groups being not necessarily mutually exclusive in any main group: that is, certain of the bridge circuits in a sub-group to which one register has access may also belong to another sub-group (in the same main group) to which another register has access. By thus giving the registers access to only a limited number of transmission bridge circuits in each group, each register can serve all the lines without requiring an unduly large number of coupling switches between each register and all the transmission bridge circuits.

A particular contact on each of the arcs CC1 to CC10 of the coupling switch CC of each register is allocated to a particular one of the transmission bridge circuits such as XB(A), XB(AB), XB(B) to which the register has access. To this contact on arcs CC1, 2, 3, 5, 8, 9 and 10 are connected the correspondingly numbered leads extending from the relevant transmission bridge, the linking bridges such as XB(AB) having an additional lead, numbered 6, which is connected to the pertinent contact of arc CC6. The leads 1, 2, 3, 8, 9 and 10 extend from back contacts respectively engaged by moving contacts *hb*1 to *hb*6 of relay HB when the latter is unoperated: lead 5 extends from relay HB and constitutes an energizing connection therefor: and lead 6 in the linking transmission bridges such as XB(AB) extends from relay HA as an energizing connection for it. Arcs CC4 and CC7 are marking arcs. In arc CC4, the contacts corresponding to transmission bridges which serve group A and are accessible to register RG are commoned as indicated by *a*, those corresponding to transmission bridges which serve group B are commoned as indicated by *b*, those corresponding to linking bridges which serve groups A and B are commoned as indicated by *ab*, and those corresponding to any other groups of transmission bridges are likewise commoned. In arc CC7 contacts corresponding to linking bridges serving a particular pair of groups are commoned as indicated by *ab*.

Of the remaining elements of the typical register RG, only those are shown which are essential to an understanding of the following description of the manner in which a call can be set up. The omitted elements, including those by which the register controls the setting of the group and line selectors and likewise of the group and line finders in accordance with the registered information in stores CGI and CDI, those by which ringing current can be fed to a called line once the selectors have been set to it, and those by which ringing, busy and other tones can be reverted to a calling line as required, may all take forms well known in register controlled automatic telephone switching systems and need not be further described here. Rectangles CON.1 and CON.2 which represent the circuits in the register by which the setting actions for the group and line finders and for the group and final selectors are controlled, have been included in order to indicate the manner in which these control circuits may be brought into action at appropriate times.

The operation of the register RG after it has been seized by a start circuit in response to a calling condition of a line is as follows:

After the register has received and stored in store CGI the requisite digits of the calling line's identity, one of the group relays such as GPA or GPB is operated according to the particular line group which contains the calling line. Let it be assumed that a line in group A is calling, so that group relay GPA operates. At contact *gpa*1, over contacts *rd*1 and *rdr*1, group relay CPA connects a high speed testing relay T to the contacts commoned at *a* of the test arc CC4 of the coupling switch. At contacts *gpa*2, relay GPA completes via contacts *t*1 and *ta*1 an energizing circuit for the control magnet DM of the coupling switch CC, which thereupon begins to drive round. If relay GPB had operated rather than GPA, contact *gpb*1 would have connected the test relay to the *b* common on test arc CC4 and contact *gpb*2 would have completed the energizing circuit for magnet DM.

A free transmission bridge such as XB(A) or XB(B) has its associated group finder GF resting in its home position, in which position a "free" negative potential, derived over a resistor R is fed (FIG. 1) from the P-arc of the group finder, via contact *hb*3 and lead 3, to the contact relating to that bridge on arc CC3 of the register coupling switch. When the coupling switch reaches a free transmission bridge in the required group (being group A in the present instance) this negative potential is extended, over contact *ta*2, the interconnected wipers of arcs CC3 and CC4, the contacts commoned at *a* of this latter arc, operated contact *gpa*1 and contacts *rd*1 and *rdr*1, to the testing relay T, which thereupon operates and stops the coupling switch CC by opening contact *t*1 in the energizing circuit of magnet DM. Contact *t*1 also completes an energizing circuit for relay TA, which operates and holds via its contact *ta*3 and contacts *rd*2 and *rdr*2. Contact *t*2 of relay T short circuits one winding of relay T so that a near-earth busy condition is fed back to the relevant contact on arc CC3, it being assumed that the remaining winding of relay T is of low impedance relative to resistance R. The transmission bridge concerned has now been effectively seized. At contacts *ta*2, *ta*4 and *ta*5, relay TA couples the control circuit CON.1 to the coupling switch arcs CC1, 2, 3, and this control circuit thereupon proceeds, in dependence upon the calling line's identity as registered in store CGI, to bring about a setting action by which the group finder secondary switch such as GF(A) associated with the seized transmission bridge circuit is set to a free primary switch such as LF/FS(A) in the group serving the calling line, followed by the setting of this primary switch to the calling line. This double setting action, by which an access path between the calling line and the register is established via the coupling switch CC, the calling side of the seized transmission bridge circuit, a secondary switch such as GF(A) and a primary switch such as LF/FS(A), can be achieved under control of the register in any suitable known manner: for instance it can be achieved by revertive impulse control, in which case the group finders and line finders would have to include an additional arc from which to revert impulses to the register while they are in process of being set. Relay T releases when the group finder such as GF(A) moves off its home contact.

Assuming the calling line to be a subscriber's line with dial, the register then sends dial tone to the line and receives from it, over coupling switch arcs CC1, CC2, dialled information identifying the called line. This information is registered in digit store CDI, which has become coupled to arcs CC1 and CC2 by operation of contacts *at*1 and *at*2 of a relay (not shown) operated by the control circuit CON.1 once a line finder has been set to the calling line. The digit store CDI operates one or another of the group relays such as GPA′ and GPB′ according to the line group of the called line as registered in this store.

If the called line is in the same group as the calling line, relay RS operates: otherwise relay RD or RDR operates. For a call between lines in group A, group relays GPA and GPA′ operate and their contacts *gpa*2 and *gpa′*1 complete an operating circuit for relay RS. Likewise for a call between lines in group B, relays GPB and GPB′ would operate and complete an energizing circuit for relay RS via contacts *gpb*2 and *gpb′*1. On the other hand, for a call from group A to group B, relay RDR becomes operated when relays GPA and GPB′ operate to close their contacts *gpa*3 and *gpb′*2, whereas for a call from group B to group A, relays GPB and GPA′ operate and close their contacts *gpb*3 and *gpa′*2 to operate relay RD.

For a call between lines in the same group, the seized transmission bridge is suitable and the control circuit CON.2 in the register can proceed to set the associated group selector such as GS(A) and a free primary switch such as LF/FS(A) which is now acting as final selector. The control circuit CON.2 acts over coupling switch arcs CC8, 9, 10, in dependence on the information registered in store CDI, in a manner similar to CON.1 over arcs CC1, 2, 3, being coupled to each of these arcs CC8, 9, 10 over a relay contact network *rs*1, *rd*3, *rdr*3, *x*1 and *ta*6, which is repeated for each of the arcs CC8, 9 and 10. If relay RS operates to indicate that the call is between lines in the same group, the control circuit CON.2 is immediately coupled to the arcs CC8, 9, 10 over the network contacts *ta*6 and *rs*1. After a final selector has been set to the call line (assuming it to be free), the control circuit CON.2 operates a relay (not shown) which by closing contact *bh*1 completes over coupling switch arc CC5 an energizing circuit for relay HB in the seized transmission bridge, thereby interconnecting the calling and called lines via contacts *hb*1 to *hb*6.

If, on the other hand, relay RD or RDR operates, indicating that the call is between different line groups and that therefore a linking transmission bridge such as XB(AB) has to be used, then contact *rd*1 or *rdr*1 of whichever of these relays is operated re-connects the testing relay T to the contacts commoned at *ab* of the coupling switch test arc CC4, while contact *rd*2 or *rdr*2 opens the holding circuit of relay TA. This relay therefore releases and at its contact *ta*1 re-establishes the energizing circuit for the coupling switch control magnet DM. The coupling switch thereupon searches for and sets to a free linking transmission bridge circuit such as XB(AB) under control of arcs CC3 and CC4 and relay T as before. Operation of relay T again causes operation via its contacts *t*1 of relay TA, which this time locks via a contact *ar*1 of a relay AR, this latter relay having been operated by closure of contact *rd*4 or *rdr*4 of relay RD or RDR. If relay RDR has operated, relay AH operates over its contact *rdr*5 and at contact *ah*1 establishes over coupling switch arc CC6 an energizing circuit for the reversing relay HA in the seized linking transmission bridge circuit. According to whether or not the seized bridge circuit is thus reversed, the control circuit CON.1, with contacts *at*1 and *at*2 restored to normal, controls the setting of the associated group finder secondary switch such as GFS(AB) or GSF(AB) as the case may be, followed by the setting of a line finder primary switch to the calling line. With the coupling switch CC set to a linking bridge circuit, a contact X operates over arc CC7 by reason of the common earthing (indicated by *ab* on this arc) of the arc contacts relating to the linking bridges. With relay X and relay RD or RDR operated, the control circuit CON.2 is this time coupled for action to arcs CC8, 9, 10, on the re-operation of relay TA, by way of contacts *x*1 and *rd*3 or *rdr*3 in the contact networks already referred to. Contact *x*1 prevents this coupling being effected on the initial operation of relay RD or RDR while the coupling switch is still set to the original bridge circuit and before relay TA has been released.

The circuit details and operation as described above, especially in respect of the register, must be understood to have been given more as an indication of a possible manner of application of the invention than as a fully sophisticated arrangement. It will therefore be appreciated that in practice, according to the facilities required and other considerations, many modifications and additions may be made, without, however, departing from the scope of the invention as set out in the following claims.

What I claim is:

1. In a switching system for a number of groups of lines each served by a group of primary switches operable for both line finding and final selection under control of a register which in serving a call receives and registers information as to the identities of both calling line and called line, a plurality of transmission bridge circuits for each primary switch group, each connected for affording access through it between primary switches within the group, a plurality of linking transmission bridge circuits for each pair of primary switch groups, each connected for affording access through it between primary switches respectively belonging to the two switch groups of the pertinent pair, each said linking transmission bridge circuit having means operable under register control for reversing the sense of its connection between the primary switches dependent on the direction of a call between these switches.

2. A switching system as claimed in claim 1, wherein the reversing means for each linking transmission bridge circuit includes a reversing relay operable to reverse the bridge circuit and controllable from a register in dependence upon the calling and called line identities stored therein.

3. A switching system as claimed in claim 1, wherein a register includes means for seizing a free transmission bridge circuit having access to a calling line whose identity the register has received, means for controlling the establishment between the calling line and the register, via the seized bridge circuit and a primary switch, of an access over which the register receives the identity of a called line, and means operable according to the respective line groups to which the identified calling and called lines belong for causing the seizure, if necessary, of another transmission bridge capable of affording access between said lines.

4. A switching system as claimed in claim 1, wherein a register comprises a coupling selector switch operable subsequently to receipt of a calling line's identity and controllable by the register to seize a free transmission bridge circuit having access to the identified calling line over the primary switch group which this bridge circuit serves, means for controlling the establishment between the calling line and the register, via the seized bridge circuit and a switch of said primary switch group, of an access path over which the register receives the identity of the called line, and means operable according to the line groups of the calling and called lines to cause, if necessary, reoperation of the coupling switch to seize another transmission bridge circuit capable of affording access between the two lines.

References Cited in the file of this patent

UNITED STATES PATENTS

| | | |
|---|---|---|
| 2,813,929 | Oberman | Nov. 19, 1957 |
| 2,871,297 | Leonard | Jan. 27, 1959 |
| 2,872,527 | Bray et al. | Feb. 3, 1959 |
| 2,907,832 | Boswau et al. | Oct. 6, 1959 |